United States Patent
Yungul

[11] 3,965,413
[45] June 22, 1976

[54] DETERMINATION OF THE POLARITY OF REMANENT MAGNETIZATION OF AN EARTH FORMATION PENETRATED BY A BORE HOLE USING A HIGHLY ACCURATE MAGNETOMETER FOLLOWED BY PROCESSING OF RESULTING AS WELL AS ASSOCIATED DATA

[75] Inventor: Sulhi H. Yungul, Fullerton, Calif.

[73] Assignee: Chevron Research Company, San Francisco, Calif.

[22] Filed: July 29, 1974

[21] Appl. No.: 492,638

[52] U.S. Cl. .................................................. 324/8
[51] Int. Cl.² .......................... G01V 3/00; G01V 3/18
[58] Field of Search ................................. 324/1, 6, 8

[56] References Cited
UNITED STATES PATENTS

| | | | |
|---|---|---|---|
| 2,259,904 | 10/1941 | McNamee et al. | 324/8 |
| 2,401,280 | 5/1946 | Walstrom | 324/8 |
| 2,664,542 | 12/1953 | Lynn | 324/8 |
| 2,716,730 | 8/1955 | Williams | 324/8 |
| 3,014,177 | 12/1961 | Hungerford et al. | 324/8 |
| 3,317,821 | 5/1967 | Patton et al. | 324/8 |
| 3,369,174 | 2/1968 | Groenendyke et al. | 324/8 |
| 3,391,335 | 7/1968 | Patton et al. | 324/8 |

Primary Examiner—Gerard R. Strecker
Attorney, Agent, or Firm—R. L. Freeland, Jr.; H. D. Messner

[57] ABSTRACT

In accordance with the present invention, the polarity of the remanent magnetization of an earth formation penetrated by a bore hole is accurately determined utilizing a highly sensitive magnetometer positioned within the bore hole in a direction S within the bore hole. The magnetometer is positioned such that its response direction remains parallel to the S direction at a plurality of logging stations along the vertical extent of the bore hole. The magnetometer can be oriented at the earth's surface, or in situ, to assume a posture which will place the magnetometer in the aforementioned position at a given logging depth. The response measured is the intensity of the total contribution from the remanent and induced magnetization of the formations adjacent to the well bore. In order to determine the remanent magnetization contribution, elimination of the induced magnetization contribution is provided, as by: (i) determining the amplitude of the earth's field in the S direction, (ii) determining the magnetic susceptibility at each logging station and (iii) subtracting the induced magnetization contribution from the total magnetization contribution.

7 Claims, 7 Drawing Figures

DETERMINATION OF THE POLARITY OF REMANENT MAGNETIZATION OF AN EARTH FORMATION PENETRATED BY A BORE HOLE USING A HIGHLY ACCURATE MAGNETOMETER FOLLOWED BY PROCESSING OF RESULTING AS WELL AS ASSOCIATED DATA

RELATED APPLICATION FILED SIMULTANEOUSLY HEREWITH AND INCORPORATED HEREIN BY REFERENCE

S. H. Yungul, Ser. No. 492,639, for DETERMINATION OF THE POLARITY OF REMANENT MAGNETIZATION OF AN EARTH FORMATION PENETRATED BY A BORE HOLE USING AN ACCURATE MAGNETOMETER.

BACKGROUND OF THE INVENTION

1. Field of the Invention

The present invention relates to a method of determining the remanent magnetization of an earth formation penetrated by a bore hole so as to indicate the geologic age of a segment of the formation and to document stratigraphic boundaries occurring, say, during generation and migration of petroleum over a given span of geologic time such as when accumulative traps were generated.

Geologic dating of the relevant adjacent sections of strata within a bore hole by conventional means is both time-consuming and costly. Use of in-hole dating equipment such as magnetometers and the like has not been successful in age-dating due to inaccuracy of the generated results. Use of cores of sediments, i.e., long cylinders of successive layers of sediment, is likewise costly and requires extensive well time to accomplish.

BACKGROUND OF THE PRIOR ART

It is well known in carrying out geologic dating that the magnetization of a section of earth formation is associated with magnetic fields that are intrinsic to that body and act at a distance from it. Since the direction and strength of the fields can be identified, there can be gained an indication of both origin of the body and, hence, its geologic age assuming the field of interest can be accurately determined.

That the magnetization of a given sample volume of an earth formation is a source of potential magnetic field in accordance with the following equation is well known:

$$\vec{M} = M_{\vec{R}} + K\vec{H}_o$$

where $M$ equals the magnetization or magnetic dipole moment per unit volume of a sample;

$M_{\vec{R}}$ equals the natural remanent magnetization of the sample; and $K\vec{H}_o$ equals the induced magnetization of the sample.

In contrast with the above known functional relationship, the measurement of the contribution of the natural remanent magnetization can be difficult to obtain since measurements are carried out in the presence of the earth's field. Not only is the intensity of the anomaly due to the remanent magnetization small in comparison with the induced magnetization, but also its direction is dependent upon the paleomagnetic origin of the sample as well as subsequent movement of the sample remote from the origin as a function of geologic time ("continental drift").

SUMMARY OF THE INVENTION

In accordance with the present invention, the remanent magnetization of an earth formation penetrated by a bore hole is accurately measured utilizing a high-sensitivity and directional magnetometer positioned within the bore hole in a direction S of maximum natural remanent magnetization of the formation. The response measured is the intensity due to the total contribution from the remanent and induced magnetizations of the formations adjacent to the well bore. In this application, the term "S direction" refers to the approximate average direction of the remanent magnetization associated with rock sources adjacent the bore hole, and is determined from the data available in the published literature on plate tectonics and from investigations of the nature of such rock sources including, inter alia, (i) the approximate average geologic age of such sources, (ii) paleolatitudes of (i), above, at formation, and (iii) the average inclination $I_r$, and declination, $D_r$, of the remanent magnetization of the formation.

In order to determine the remanent magnetization contribution, elimination of the induced magnetization contribution occurs. First, conventional magnetic susceptibility measurements at each logging station are carried out. Such measurements can be generated using either AC measurement techniques such as shown in U.S. Pat. No. 3,555,409 for "Magnetic Susceptibility Logging System", G. R. Atwood et al, or DC measuring techniques such as shown in U.S. Pat. No. 3,665,296 for "Susceptibility Meter for Field Use for Determining Susceptibility of a Rock Outcrop", H. Gross et al. Next, the earth's normal field at the earth's surface in the S direction is determined. Then the induced magnetization contribution is substracted from the measured, in-hole total magnetization contribution using, say at the earth's surface, processing circuits to perform the required mathematical operations, viz, by (i) after determining the product of earth's field in the S direction at the earth's surface substantially unaffected by subsurface anomalies and after determining the magnetic susceptibility of the adjacent rock sources, calculating the contribution of the magnetic anomaly from the induced magnetization $KH_o$ and (ii) after substracting the magnitude of the earth's normal field $H_o$ in the S direction from the intensity of the formation magnetic anolamy to provide a difference residual operator, $\Delta H_S$, substracting from said difference operator the contribution of the induced magnetization to provide a second difference operator $[\Delta H_S]r$ equal to the magnetic anomaly due to the remanent magnetization at the depth of interest.

Indicating remanent magnetization properties in accordance with the method of the present invention is not a mere happenstance, but is based on a combination of discoveries, including the facts: (1) That oil is usually produced from rock sources of the Cenozoic (Tertiary) and Mesozoic eras deposited onto continents and continental margins during a time span where the continents were drifting in a northwardly direction as break up of Laurasia and Gondwanaland occurred (as explained in "The Break-up of Pangaea", *Scientific American*, October 1970, Gondwanaland comprised South America, Africa, India, Antarctica and Australia; Laurasia included North America, Europe and Asia): (2) That in a majority of today's petroleum provinces the vertical component of the induced magnetization ($KH_o$) is larger than its horizontal component, whereas the vertical component of the remanent magnetization ($M_R$) is smaller than its horizontal component; (3) that a primary source of remanent magnetization in sedimentary rocks is a detrital remanent magnetization contributor whose inclination is lower than that of the orienting field in accordance with the equation: tan $Ir$ = 0.4 tan $I$, where Ir is the inclination of the remanent field, $I$ is the ambient field inclination; and (4) that the angle between the two magnetization vectors, $\vec{KH_o}$ and $\vec{M_R}$, is usually large, about 50°.

Based upon factors such as the above, in accordance with the present invention, it has been found that if the response of the magnetometer is disposed in a direction S within a bore hole at a given depth, there will be a resulting increased sensitivity so that the true indication of at least the polarity of the direction of remanent magnetization of the adjacent formation can be accurately determined.

In computing the induced magnetization contribution at a given logging depth within the bore hole, the direction and magnitude of the earth's normal magnetic field must be known. In determining the component of the earth's normal magnetic field in the S direction, the earth's normal field is measured at the earth's surface at points substantially unaffected by magnetic anomalies of surrounding as well as subsurface rocks. The techniques of measuring the direction and magnitude of the earth's magnetic field at the surface are well described in geophysical literature. For example, an earth induction technique can be used to determine declination and inclination of the earth's field using a plurality of test points, say in a 4- or 6-spot pattern surrounding the well of interest.

OBJECT OF THE PRESENT INVENTION

The object of the present invention is the provision of a novel method for accurately indicating the polarity of remanent magnetization of an earth formation penetrated by a well bore, using a highly sensitive magnetometer located within the well bore reposing in a position so as to maximize response to anomalies due to the remanent magnetization of the formation, whereby the absolute or relative geologic age of the relevant earth formation at depth can be easily and accurately determined.

FURTHER OBJECTS OF THE INVENTION

Further objects and features of the invention become readily apparent to those skilled in the art from this specification and appended drawings illustrating preferred embodiments.

DETAILED DESCRIPTION OF SPECIFIC EMBODIMENTS

Figure 1:
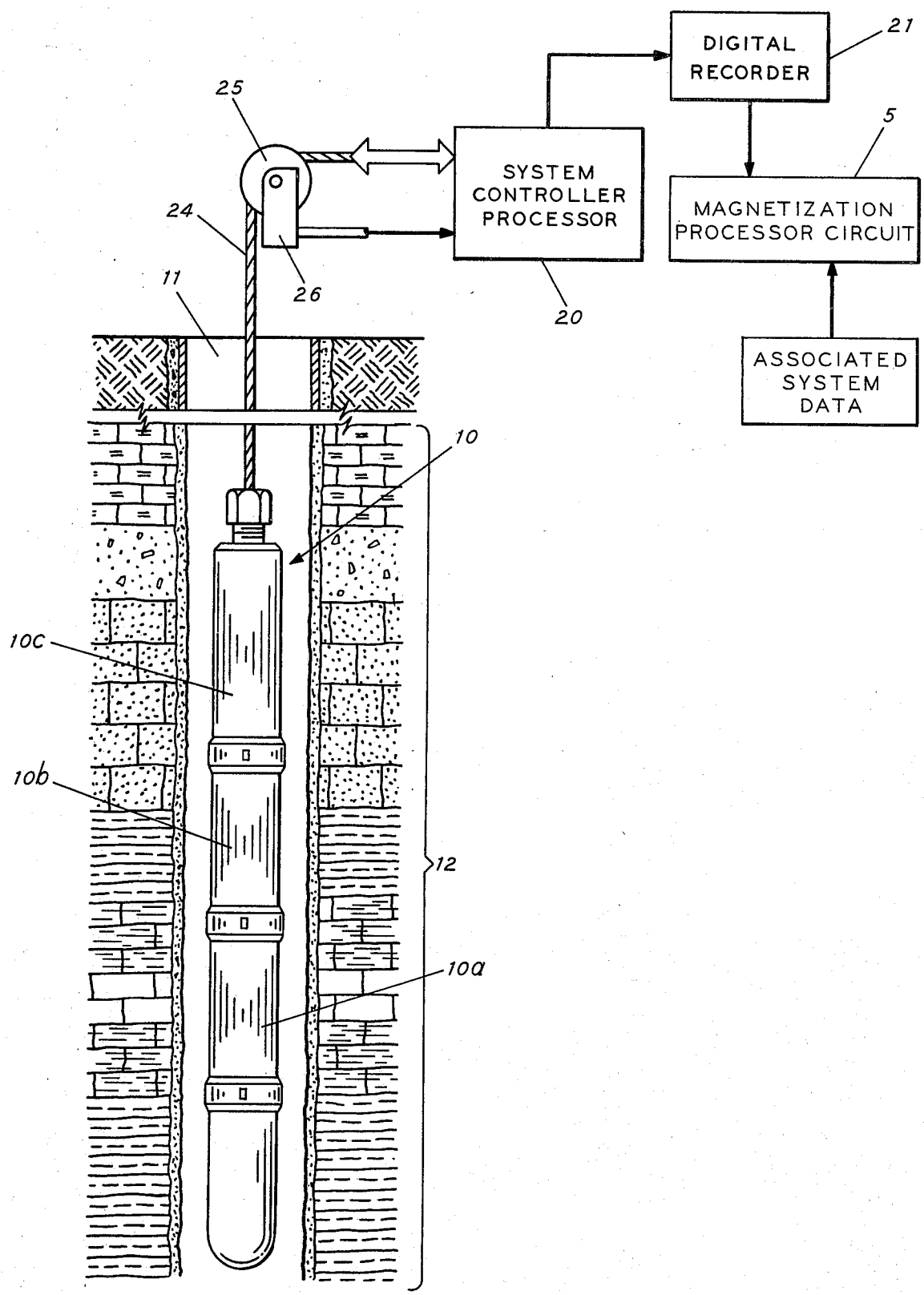
FIG. 1 is a sectional view of a bore hole penetrating an earth formation illustrating the position of a logging sonde incorporating a highly sensitive magnetometer useful in identifying the remanent magnetization characteristics of the adjacent formation.

References should now be had to the Figures, and in particular to FIG. 1. In FIG. 1, a logging sonde 10 is seen to be located at a selected logging depth within bore hole 11 adjacent to earth formation 12. The sonde 10 is provided with a series of axial abutting sections: a highly sensitive magnetometer section 10a is seen to attach below circuitry control and energization sections 10b and 10c. The purpose of the magnetometer section 10a: to provide means for measuring the magnetic field intensity of earth formation 12 in a direction S, as explained in detail below.

In accordance with the present invention, the magnitude of the directional component of the total magnetic field intensity associated with the earth formation 12 penetrated by the well bore 11 is measured in a predetermined direction S utilizing a magnetometer (not shown) carefully positioned within the magnetometer section 10a of the logging sonde 10. From that data, the remanent magnetization can be determined utilizing magnetization processor circuit 5, as explained below, the resulting remanent data aiding in (i) providing geologic age-dating of the formation 12 and (ii) providing correlation information related to sedimentary basins; i.e., correlation of bedding from well to well indicating boundaries of sedimentary formations.

Controller processor 20 at the earth's surface is in operational contact with down-hole control circuitry (not shown) housed in circuitry sections 10b and 10c, for control of, inter alia, the magnetometer within magnetometer section 10a. Temperature is also noteworthy in bringing about desired magnetometer operations. A controlled-temperature environment is probably best, at least being compatible with magnetic characteristics of the magnetometer.

In order to provide support of the logging sonde 10 within the well bore, a cable 24 is seen to be attached to uppermost section 10c of the logging sonde 10. Cable 24 also includes a series of conductors. These conductors interconnect sections 10a, 10b and 10c with controller-processor 20 at the earth's surface as explained below. Suffice it to say that in operation, energization signals are passed from the controller-processor 20 through slip-bearing assembly 25 and thence through the conductors to circuitry within sections 10b and 10c of sonde 10 for controlling the magnetometer within section 10a of the sonde 10. During detection of the magnetic field intensity of the earth formation 12, signal transmission is reversed: signals pass from the magnetometer section 10a upward through sections 10b and 10c, cable 24 and thence through slip-ring assembly 25 to the controller-processor 20 and then in proper sequence to digital recorder 21, where the information is recorded. Within the controller 20, circuits can be provided for providing associated information on such as depth of the magnetometer and the intensity of the received field in a format compatible with later processing. The mapping depth data is provided through an encoder 26 connected to the controller-processor 20; the intensity of the magnetic field is also indicated and recorded through a cooperative functioning of the controller-processor 20 in conjunction with recorder 21, as explained below. Thereafter, further processing within processor circuit 5 at the earth's surface provides a determination of mathematically related data whereby the remanent magnetization of the formation can be easily obtained. By associating depth, azimuth and magnetic field indications as explained below, information can be assimilated to indicate the geologic age of the formation being mapped.

Figure 2:
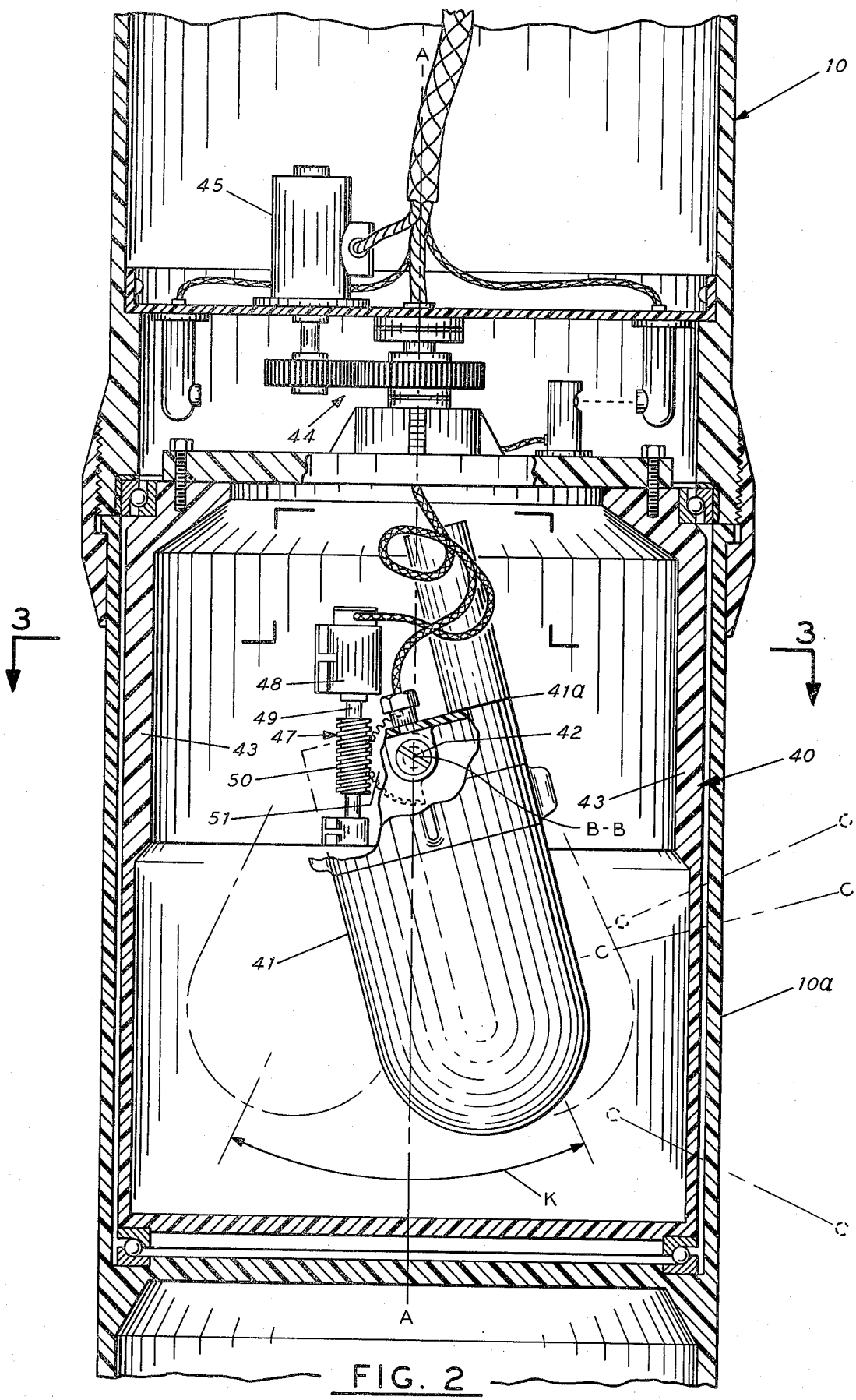
FIG. 2 is a partial sectional view of the logging sonde of FIG. 1 in which a magnetometer support capsule as well as driving equipment for reorienting the magnetometer capsule in azimuth are shown in detail.

Specific reference should be had to FIG. 2, illustrating magnetometer section 10a of the logging sonde 10 in more detail. Section 10a is seen to include a cylindrical housing 40. Interior of the housing 40 is a magnetometer capsule 41 supported by horizontally disposed shaft 42.

Cylindrical housing 40 is capable of rotational movements, in azimuth, relative to side wall 43 about axis of symmetry A—A, through operation of gear train 44 of motor 45. Both occurrence and extent of said travel are carefully controlled through appropriate circuitry so that the capsule 41 can be correctly positioned whereby the component of the total magnetic field intensity of the formation in the direction S can be detected. Since capsule 41 is affixed to housing 40, their azimuthal movements are in tandem; however, it also should be mentioned that the capsule 41 is capable of independent movement relative to the housing 40 about a second axis B—B of FIGS. 2 and 3, i.e., over arc K, through energization of gear train 47 of motor 48. The purpose of reorientation of the capsule 41 about axes A—A and B—B: to maximize sensitivity of response of the magnetometer within the capsule 41 along the direction S so that the detecting elements of the latter defines axis of maximum response parallel thereto at the depth at which investigations are carried out.

Figure 3:
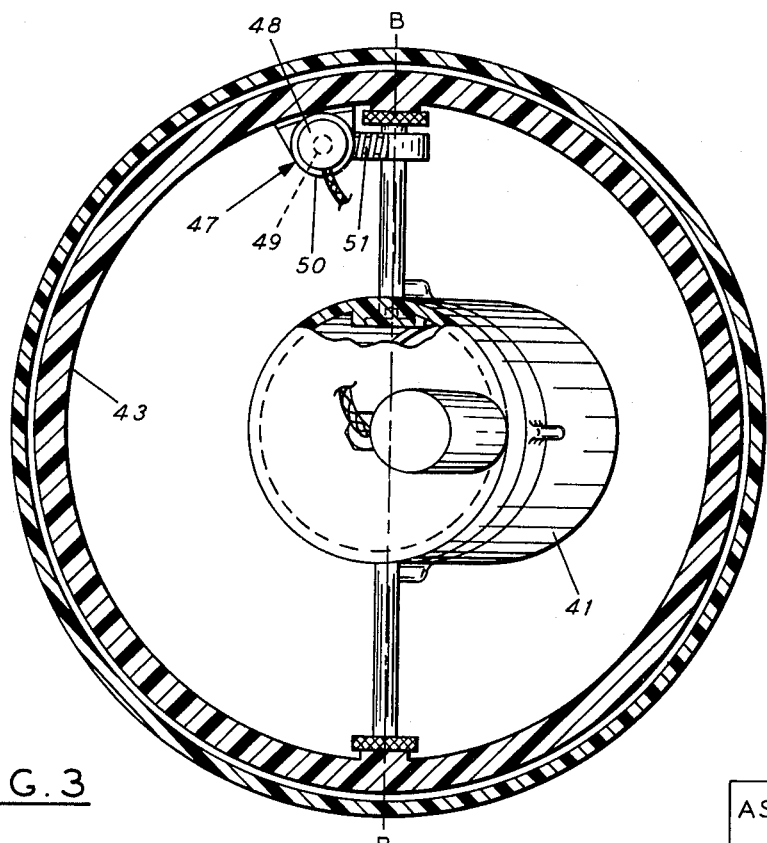
FIG. 3 is a plan view of the magnetometer capsule of FIG. 2.

FIG. 2 illustrates the gear train 47 and motor 48 in more detail. As shown, motor 48 has a shaft 49 formed with a worm gear 50 in contact with a sector gear 51. As shown in FIG. 3, the sector gear 51 is attached to the support shaft 42 defining the aforementioned axis B—B about which independent rotation of capsule 41 can occur. Attachment occurs near the journaling end of the shaft 42 to the side wall 43 of the housing 40 in order to minimize vibrational fatigue.

In accordance with the present invention, orientation of the capsule 41 of FIG. 2 relative to axes A—A and B—B must be carefully controlled. For this purpose, it is proposed to controllably activate motors 45 and 48 for rotation of the capsule 41, such rotation preferably taking place well prior to insertion of sonde 10 within the bore hole to be investigated, but can also occur at depth, if desired.

Correct orientation of the capsule 41 in a direction S at the logging depth of interest presupposes that the S direction can be determined. As previously mentioned, the term "S direction" refers in this application to the approximate average direction of the remanent magnetization associated with rock sources adjacent the bore hole, and is determined from the data available in the published literature on plate tectonics and from investigations of the nature of such rock sources including, inter alia (i) the approximate average geologic age of such sources, (ii) paleolatitudes of (i), above, at formation, and (iii) the average inclination Ir, and declination, Dr of the remanent magnetization of rock sources.

As the magnetometer detects flux in the S direction with maximum efficiency at each logging station, i.e., determines the component of the total magnetic field intensity in the S direction, $H_S(z)$, at the earth's surface processing circuits perform mathematical operations which determine the magnitude of the magnetic anomaly due to remanent magnetization contribution at each logging station. Determination of the latter properties in accordance with the method of the present invention is not a mere happenstance, but is based on a combination of discoveries associated with earth formations in general and associated with petroleum generation and migration in particular, including the factors:

a. most oil-producing sources are associated with the Cenozoic and Mesozoic eras, b. a majority of today's petroleum provinces lie at an average 40°N latitude which can be normalized to 28°N paleolatitudes for the Cenozoic and 25°N for the Mesozoic, assuming a Laurasian origin for the rock source, c. the average inclination of the induced magnetization is equal [corresponding to (b) above] to 60°N, d. further, because the primary source of remanent magnetization in sedimentary rocks is detrital remanent magnetization of which the original inclination is lower than that of the orienting field in accordance with the equation tan $Ir = 0.4$ tan $I$, where $Ir$ is the inclination of the remanent field and $I$ is the ambient field inclination; accordingly, for (b) above when inclination of the external field was about 43°, i.e., $I = 43°$, then $Ir = 20°N$, e. however, the average inclination of the induced magnetization of (b), i.e., at 40°N latitude, is about 60°N, f. while (b)–(e) relate to deposits of Laurasian origin, the reverse seems to apply to sources associated with Gondwanaland, e.g., these lands appeared to have been closer to the South Pole than to the Equator at least through the Mesozoic, while today they are closer to the Equator. The average latitude of Australia was 70°S in the Triassic, 45°S in the Eocene, and is 25°S today. Therefore, in some parts of the Gondwana, the remanent magnetization inclination is 80°S, the present normal field is 40°S if the secular variation is removed. It is well known that the long-term average positions of the magnetic poles coincide with the geographic poles. The nondipolar field, which is primarily in the form of anomalies of the order of 5,000 km in extent, shifts on the surface of the earth at about 1 cm/sec. Therefore, the long-time average of the field (say 10,000 years) is close to a dipolar field whose axis coincides with the geographic axis. Thus, the long-time average of the inclination, I, is related to the average geographic latitude, y, during that period by means of the simple dipolar field relation, tan $I = 2$ tan $y$, g. then there is the third case, in which a deposition sample moved from a southerly latitude to a northerly one, say from 25°S to 25°N. The present earth's field has a northerly inclination, the remanent magnetization a southerly one, and the angle between them is large, h. in all cases since the continents drifted northward appreciably, there ought to be a large angle between the earth's present field and remanent magnetization vectors. The inclination error may increase or decrease this angle; it increases for most of the major oil fields. An average figure is probably somewhere between 40° and 70°, so far as the petroliferous sedimentary basins are concerned.

Next, the component of the earth's normal magnetic field in the S direction is accurately measured at the earth's surface substantially unaffected by subsurface magnetic anomalies. For this purpose, a commercially available directional magnetometer, or the magnetometer of FIG. 2, can be used.

After the earth's S direction component has been determined but before the sonde is lowered to the first logging station of interest, motors 45 and 48 of FIG. 2 are activated: Capsule 41 is reoriented relative to axes A—A and B—B so that at the depths of interest measurements of a sample volume are maximized along direction S parallel to the axis of response C—C of the magnetometer of FIG. 2.

Variations in the methodology of carrying out the present inventions can occur.

For example, it should be obvious that atop the capsule 41 there can be provided a servosystem so that reorientation of the capsule 41 at the earth's surface can be automatically accomplished. That is, a signal comparator circuit could provide energization of motors 45 and 48 based upon signal inputs computed from the directional data. In that way, the capasule 41 can be driven in rotation until a standard reference signal level (within the comparator) is achieved.

Response of the magnetometer of FIG. 2 is maximum to flux lines parallel to its axis of maximum response C—C parallel to the direction S. Result: if the axis C—C is parallel to the direction S at each logging depth, the total magnetic field component of the formation in that direction can be quite accurately determined.

The operational functions of the controller-processor circuit 20 of FIG. 1 of the present invention are most easily divided into operating cycles related to (i) recording the magnetic signals, and (ii) generating and recording information related to the depth and azimuthal direction of response of the magnetometer within logging section 10a, as forth in detail below.

INDICATING MAGNETIC SIGNALS AT DEPTH

Figure 4:
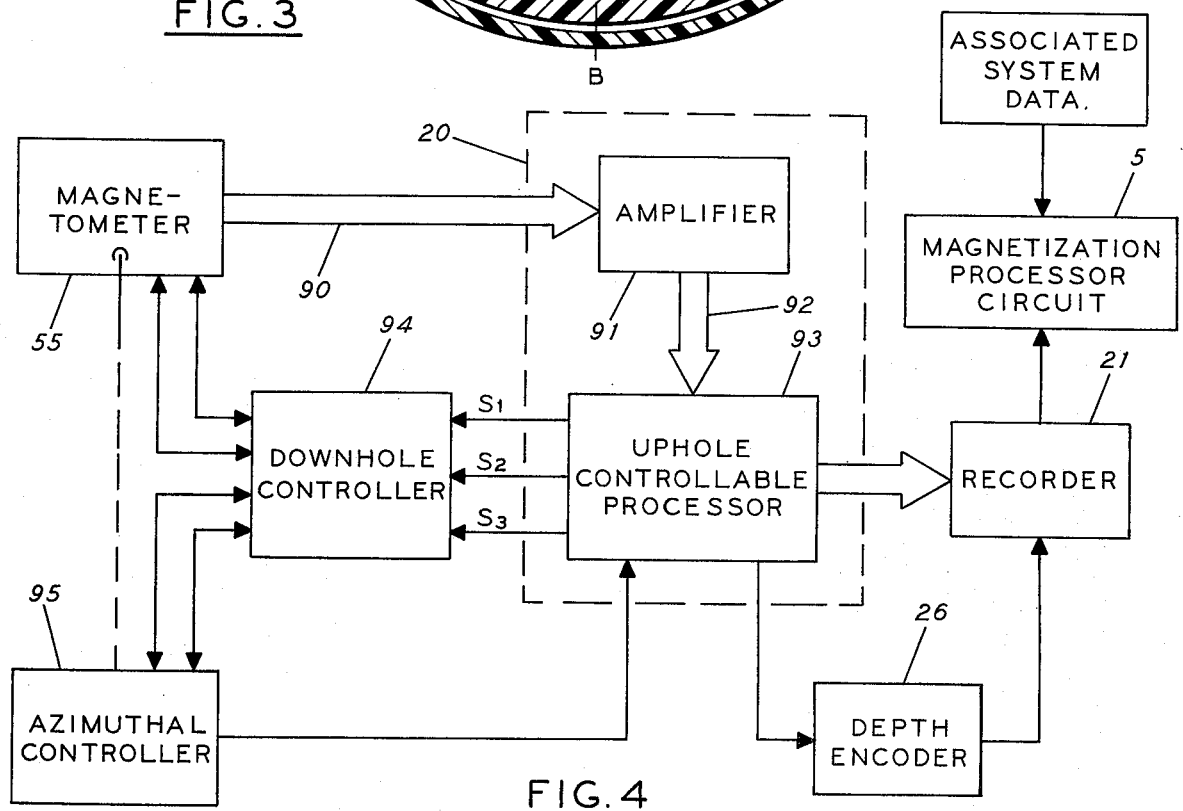
FIG. 4 illustrates, in functional block form, the remanent magnetic logging system, including the magnetometer of FIGS. 2 and 3, for carrying out the method of the present invention.

As shown in FIG. 4, the output from the magnetometer 55 enters the controller-processor 20 via conductor means 90, thence through amplifier 91 and conductor means 92 to uphole controller-processor 93, and finally to recorder 21. Within the uphole processor 93 as well as in downhole controller 94, logic circuits are provided for correct sequential operations of the system of the present invention. e.g., within the processor 93, a series of timing signals can be produced which are applied to downhole controller 94 through conducting means. The purpose of the timing signals: To coordinate operations of circuit elements as to when each must perform a preselected function. Whole operations are preferably performed in synchronism. Each operation requires the passage of a certain number of timing signals and, consequently, the timing to complete any one of the various operations is an exact multiple or fraction of each other. Thus the recording at the recorder 21 can be accomplished at specific intervals of time that are exact multiples of the timing signals, if desired.

Several elements of the processor-controller 20 may be in need for further illustration. e.g., if the amplitude of the magnetometer response signals is to be digitally recorded, it must be first sampled, in sequence, over a plurality of very small time intervals, and then the results transferred to an analog-to-digital converter, where the digital results of the multiplexing operation are represented as a series of multi-bit binary code indications. The binary code information is suited for storage onto a magnetic tape at the recorder 21. Otherwise the signals can be recorded in a conventional analog format, say amplitude-vs.-time.

In addition to controlling the recording of the detected magnetic signals, the controller processor 20 of FIG. 4 can be also used to assimilate encoding and digitization of depth data onto the recording medium of the recorder 21. From FIG. 1, it is seen that connected to processor 20 are depth encoder 26 and azimuthal controller/encoder 95, the latter through downhole controller 94. The latter is located downhole, while the former are located uphole. When the processor 20 generates a series of enabling signals, such signals being indicated in FIG. 4 as $S_1$, $S_2$ and $S_3$ at the controller 94, a series of functions are carried out in sequence related to operations of the magnetometer 55 and the azimuthal controller 95.

Consider that the logging sonde has been located at a depth in the bore hole to be investigated. Depth encoder 26 of FIG. 4 is then activated to generate data indicative of that depth. By convention, such annotation is usually recorded at the header section of the record being generated by the recorder 21. The synchronization of the encoding is by way of timing circuits within the uphole controller processor 20 so that the depth data—in proper format—can be gated to the recorder 21.

As previously described with reference to FIG. 4, the purpose of the uphole controller processor 20 is to provide a series of timing signals for controlling operation of downhole controller 94 and thence azimuthal controller encoder 95 and magnetometer 55 as explained hereinbefore. Thus, these circuits are seen to be interconnected as shown, with processor 20 in series between the downhole controller 94, the latter being in parallel with azimuthal controller/encoder 95 and magnetometer 55. By the way, control knobs (not shown) can be used to vary the duration of the signals S1–S3 at uphole processor 93, if field conditions dictate.

Downhole controller 94 is preferably of conventional design so as to provide two sets of enabling signals: a first set for energizing azimuthal encoder 95, including an absolute azimuthal circuit (not shown); and a second group of signals for operation of the magnetometer itself.

With regard to the former, it should be noted that as to measuring absolute azimuthal position, an absolute azimuthal measuring means can be provided as is conventional in the geophysical literature and should include an analog compass measuring apparatus.

With regard to the latter, the enabling signal from the downhole controller 94 (FIG. 4) for activation of circuitry associated with the magnetometer 55 is for the purpose of enabling power supplies (not shown) connected to the magnetometer through a switching and gate network (also not shown). Signals from the magnetometer indicative of the magnetic field intensity of the rock sources adjacent to the bore hole pass uphole to the processor-controller 20 and thence to recorder 21.

MAGNETOMETER 55

The magnetometer 55 must provide directional as well as amplitude resolution within acceptable limits. In this regard, it has been found that the magnetometer 55 of FIGS. 2–3 should have an accuracy of 0.01 gamma (RMS), where a gamma is $10^{-5}$ gauss, in order to provide acceptable remanent magnetization data. For example, a Fluxgate magnetometer can be utilized for this purpose.

Fluxgate magnetometers use a ferromagnetic core of high permeability. The remanent magnetic field of interest can be superimposed upon a cyclic field induced by a sufficiently large AC signal in a coil about the core magnet. Result: Saturation of the core occurs, and the time in the energization cycle of such saturation is a measure of the intensity of the field of interest. E.g., see the following U.S. Pat. Nos.: (i) 2,975,360 for "Magnetometer Flux Meter and Gradiometer"; (ii) 2,942,180 for "Magnetic Field Measuring System"; (iii) 2,942,179 for "Magnetometer Circuit"; (iv) 3,159,785 for "Second Harmonics Magnetometer Having a Plurality of Transducers in Combination With Means Responsive to Flux Amplitude and Direction" and (v) 3,470,461 for "Magnetic Reasonance Device for Measuring Magnetic Field Gradients".

After signals or a series of signals indicative of the intensity of the field associated with the remanent magnetization have been generated, such signals pass uphole to the controller-processer 20 of FIG. 4 and thence to the recorder 21. With regard to interpretation of these signals, as described above, it should be noted that they indicate the intensity of the total magnetic field of the formation adjacent to the magnetometer junction in the S direction.

SIGNAL PROCESSING

Figure 5:
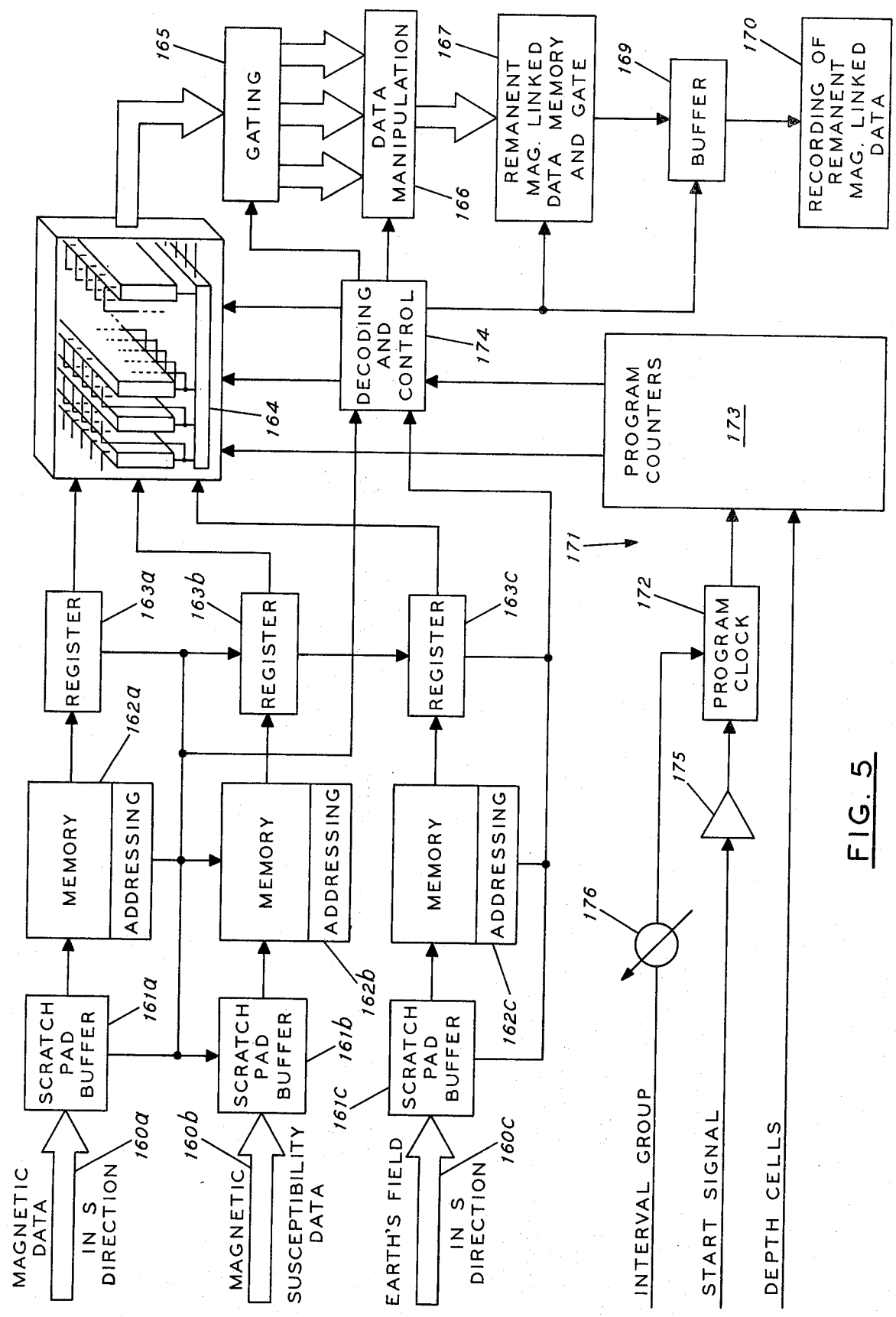
FIGS. 5 and 6 are block diagrams of magnetization processor illustrated in FIG. 1.
Figure 6:
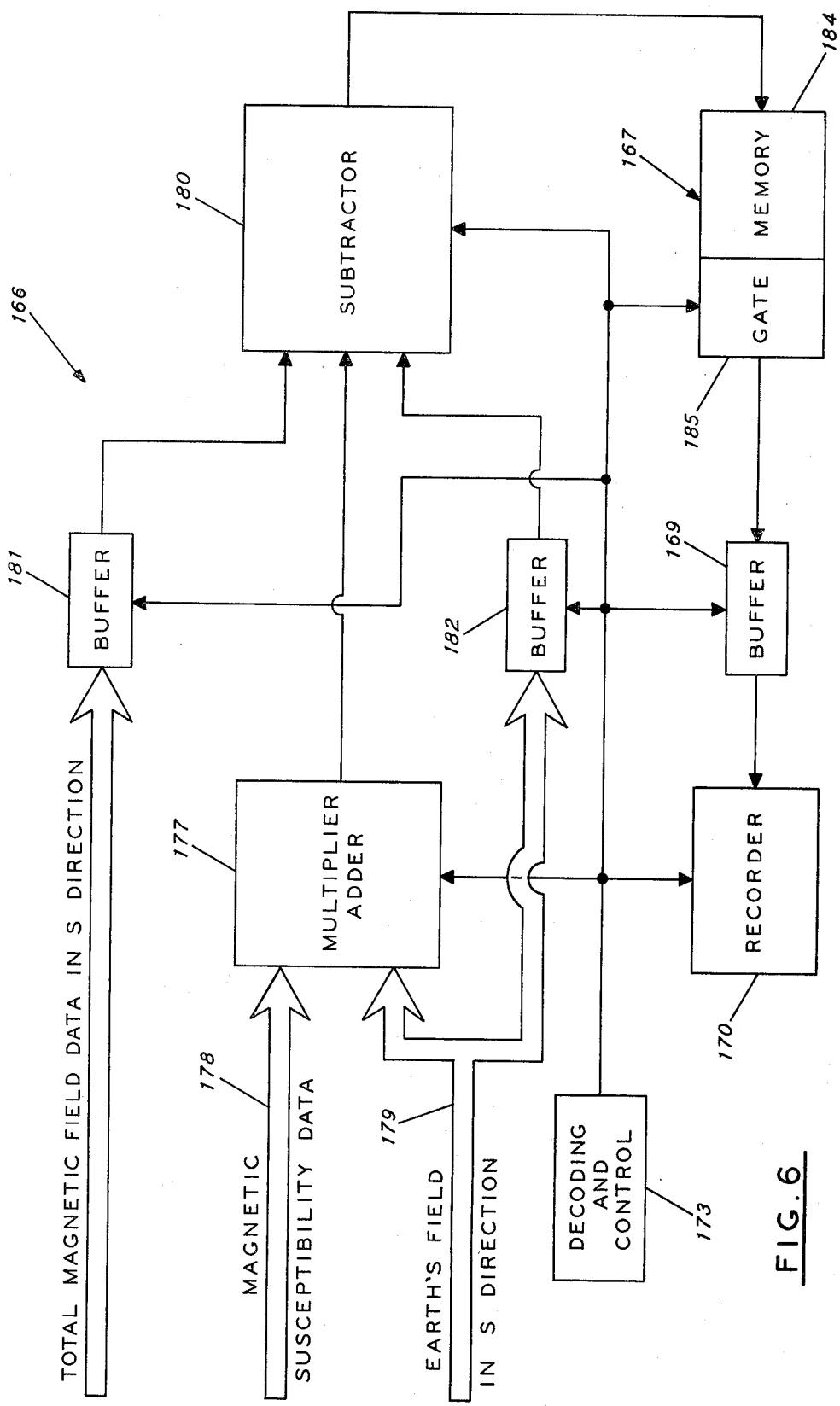

FIGS. 5 and 6 illustrate, in detail, digital magnetization processor circuit 5 of FIG. 1. As previously mentioned, the response signals at recorder 21 of FIG. 1 during downhole operations correspond to the magnitude of total magnetic field intensity of the earth formation in the direction S. As can be recalled, such signals are tabulated in cooperation with controller-processor 20 prior to being recorded at recorder 21. However, to produce indications of the remanent magnetization contribution within such signals, further processing is required as indicated in FIGS. 5 and 6.

Now in more detail with specific reference to FIG. 5, note that the data associated with the aforementioned signals are first inputted via source line 160a of processor circuit 5 after being digitized using a conventional A/D convertor (not shown). From line 160a, it flows through buffer 161a, memory/addressor 162a and register 163a to signal memory 164. Paralleling the inputting of the above data are digital data associated with two additional parameters: (1) the magnitude of the earth's field in the S direction and (2) the magnetic susceptibility of the earth formation at the given depth of interest.

As to (1) above, the digital data related to the earth's field are applied via source line 160b and then pass through buffer 161b, memory/addressor 162b and register 163b to the signal memory 164.

As to (2) above, the digital information related to magnetic susceptibility is seen to flow via source line 160c through buffer 162c and register 163c to the same signal memory 164.

Furthermore, with regard to (2) above, it should be recalled that such information may be collected using techniques and equipment described in detail in U.S. Pat. Nos. 3,555,409 and 3,665,296, described above. After the analog information has been obtained, analog-to-digital conversion of the data occurs to provide recorded magnetic susceptibility information in the format compatible with parallel processing of the data streams entering the memory 164 via source lines 160a and 160b.

The purpose of memory/addressors 162a/b/c is to pack several digital words into one memory word, as well as to reduce data flow rates into the memory 164. Since it is recognized that the instantaneous flow rate into memory/addressors 162a/b/c may be significantly higher than the average flow rate, the memory 164 can thus operate at a much slower and constant flow rate. (In this regard, the membory 164 can be a very large, high-speed random access memory device if desired.)

Next, after the data are normalized into depth and interval groups, the data are extracted from the memory 164 and pass through gate 165 to data processing circuit 166. Within the data processing circuit 166, the data streams are manipulated to provide mathematical functions, as explained below with reference to FIG. 6, whereby a difference operator is produced which defines the intensity of the magnetic anomaly due to remanent magnetization associated with the input data. As shown, the data are subsequently gated through remanent memory gate network 167, buffer 169, to digital recorder 170.

Control of operations is paced by timing and logic circuitry 171, which includes a program clock 172, programming timing counter 173, as well as decoding control circuit 174. To synchronize operation, a start signal is passed through buffer amplifier 175 to the programming clock 172. Parallel to the start signal is adjustment 176, which allows flexibility in the sequence of operations. For example, the rate at which the system recycles, i.e., iterates, can be changed by the operator by resetting adjustment 176 to a new value. Such adjustments measure how many words will be processed for a particular interval group. The program clock 172 activates program counter 173 which sequences the system through programs conventional in the art as established in the systems described. Such program counter 173 acts through the decoding and control unit 174 so as to provide sequence processing steps whereby data can be (i) extracted from membory 164; (ii) controllably gated through gates 165 and 167; (iii) recorded at recorder 170 through action of the buffer memory 169, and (iv) mathematically operated upon prior to recordation within data processing circuit 166.

FIG. 6 illustrates data processing circuit 166 in more detail. The digital data associated with a common depth level are seen in Figure to enter at two locations: (1) at multiplier-adder 177 through source conductors 178 and 179, and (2) at subtractor 180, one data stream entering through buffer 181 and the other data stream entering through buffer 182.

Within multiplier 177, the contribution due to the magnetic anomaly associated with the induced magnetization $KH_{os}$ is generated and passed through to the substractor 180. Within substractor 180, two mathematical functions are performed in sequence:

i. the earth's normal field in the S direction (HOS) is substracted from the intensity of the total magnetic field of the earth formation for a given depth z, in the S direction [$H_S(z)$] to provide a first difference operator $\Delta H_S$; and ii. the contribution of the induced magnetization at the depth z is substracted from the different operator of step (i), above, to provide a second difference operator [$\Delta H_S$]r equal to the magnetic anomaly at the given depth z due to the remanent magnetization of the subsurface formations penetrated by the bore hole.

The resulting difference operator, [$\Delta H_S$]r, flows through memory gate network 167 to buffer 169, and thence to digital recorder 170.

Figure 7:
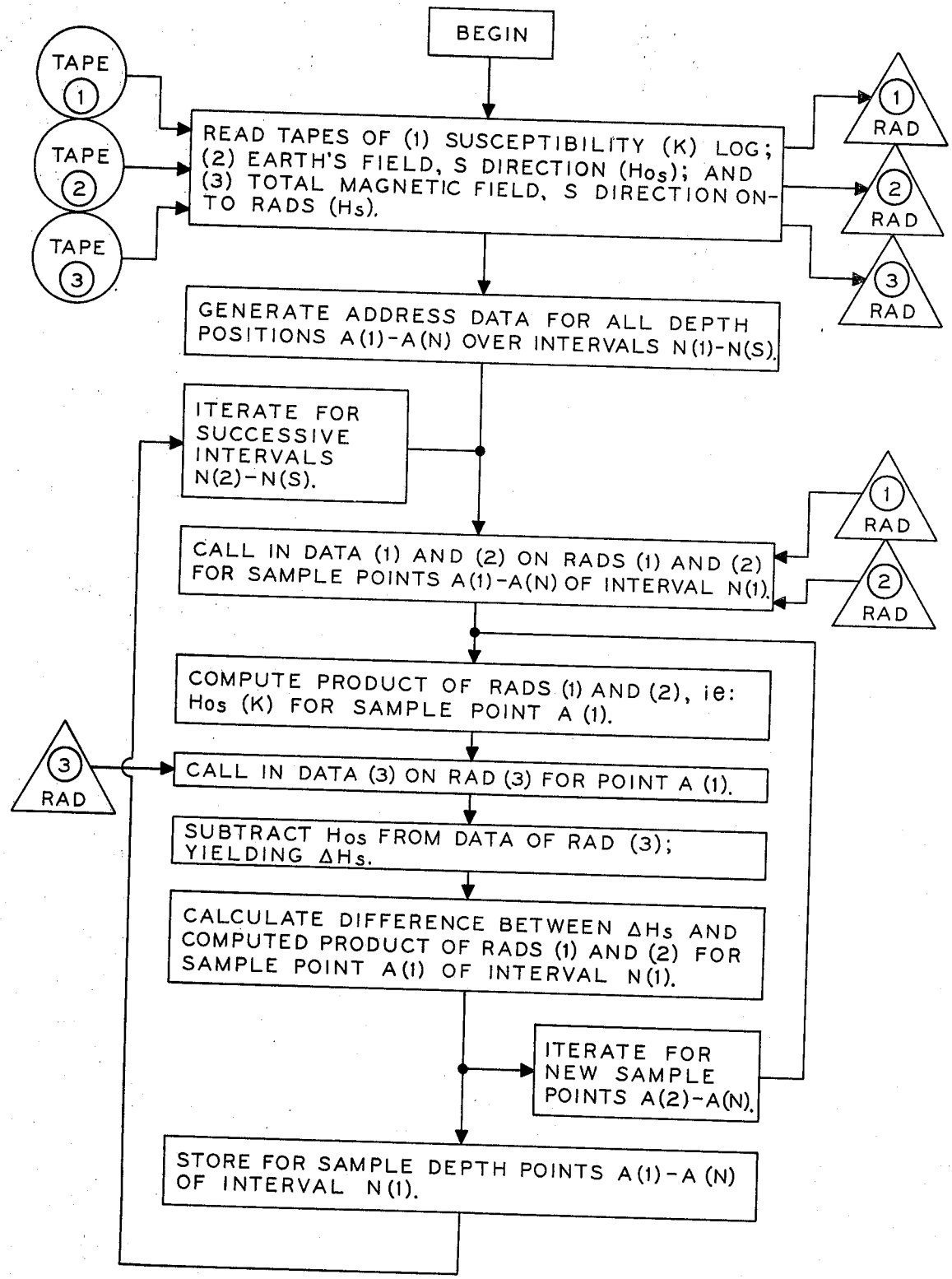
FIG. 7 is a flow chart of a general purpose computer program for performing the determination of the remanent magnetization intensity in accordance with one aspect of the method of the present invention.

FIG. 7 illustrates a flow chart of a general-purpose computer program which may be used to carry out one aspect of the method of the present invention.

As can be seen, the program is basically a three-step computation scheme in accordance with the principles discussed above. The input tapes (1), (2), and (3) are in digital format and are read directly onto large, random-access memory devices, i.e., RADS (1), (2), and (3). The program then generates all addresses for all depth positions A(1)–A(N) over intervals N(1)–N(S). Then the program calls in the data associated with RADS (1) and (2) for sample points A(1)–A(N) of interval N(1). Note that each value is stored prior to any new iteration of the new intervals N(2)–N(S). After all calculations for the interval N(1) are completed, the process steps are repeated for the intervals N(2)–N(S).

It should be apparent that while the specific steps for performing the method of the present invention relative to the mathematical calculations have been illustrated with reference to a properly programmed digital computer, it is clear that analog circuitry is readily available to duplicate such calculation without undue experimentation, viz, for determining the contribution of the induced magnetization defined above.

MODIFICATION

Three-component system: While the use of a single magnetometer 55 has been specifically described, a combination of three magnetometers could also be used to simplify field operations, e.g., to avoid requirements of precise magnetometer directional orientation, i.e., in the S direction.

In such a three-component system, each of the three magnetometers is at right angles to its neighbors. These three components may be oriented in the vertical, east and west directions, or any other arbitrary but knows directions. However, it is operationally advantageous to have them in the vertical, east and west directions. The vertical component is oriented by a self-leveling gimbal, the north component by means of a preset compass, and the east component takes the proper direction by virtue of its being rigidly fixed to the other axes. From the measurements of the components of the total magnetic field the S direction component is computed. Other features of this modified operation are the same as previously described.

While specified preferred embodiments of the invention have been described by way of illustration only, it should be understood that the invention is capable of many other specific embodiments and modifications and thus is to be solely defined by the following claims.

What is claimed is:

1. A method of indicating the polarity of the direction of remanent magnetization associated with an earth formation in a well bore penetrating said formation which comprises:

a. estimating by means of the published paleomagnetic data a direction S which is approximately in the direction of remanent magnetization at depth of interest (z);

b. positioning in said well bore magnetometer means defining an axis of response substantially coextensive with and parallel to the direction S at said mapping depth; and c. measuring the intensity of magnetic field HS (z) in said earth formation in said direction S and obtaining therefrom an indication of remanent magnetization of said formation at said depth of interest z, wherein HS is the total contribution from the remanent and induced magnetizations of the formations adjacent to the well bore.

2. Method in accordance with claim 1 in which step (c) is further characterized by the substeps of:

d. after determining the magnitude of the earth's normal field ($H_o$) in the S direction at the surface, substantially unaffected by subsurface anomalies, to yield an operator, $H_{oS}$, and after determining the magnetic susceptibility K within the depth interval of interest, calculating the contribution due to the magnetic anomaly from the induced magnetization $KH_o$ at the depth z;

e. after subtracting the magnitude of the earth's normal field $H_o$ in the S direction, ($H_{oS}$), from the intensity of the formation magnetic field, $H_S(Z)$, at the depth z to provide a difference residual operator $\Delta H_S$, subtracting from said difference operator the contribution of the induced magnetization to provide a second difference operator, [$\Delta H_S$]r, equal to the magnetic anomaly due to remanent magnetization at said depth z.

3. Method in accordance with claim 1 in which step (C) is further characterized by the substeps of:

d. after determining the magnitude of the earth's normal field in the S direction at the surface, $H_{oS}$, subtracting the formation intensity $H_S(z)$ at depth z therefrom to provide a first difference residual operator $\Delta H_S$;

e. after determining the magnetic susceptibility k within the depth interval of interest and after calculating the contribution of the induced magnetization at the depth z, subtracting that contribution from the first difference operator $\Delta H_S$ of step (d) to provide a second difference operator, [$\Delta H_S$]r, equal to the magnetic anomaly due to remanent magnetization at said depth Z.

4. Method in accordance with claim 1 in which step (c) is further characterized by the substeps of:

d. determining the magnitude of the earth's normal field ($H_o$) at the surface in the direction of S to provide an operator, $H_{oS}$, at the depth of interest z;

e. subtracting the result of step (d) from the intensity of the magnetic field of said earth formation, $H_S(z)$ in the direction S to provide a difference residual operator, $\Delta H_S$, at the depth of interest z;

f. after determining the magnetic susceptibility, K, within the depth interval of interest, calculating the contribution due to the magnetic anomaly from the induced magnetization $KH_o$ at said depth of interest z;

g. subtracting the contribution of the induced magnetization from the result of substep (e) to provide a second difference operator, [$\Delta H_S$]r, equal to the magnetic anomaly due to remanent magnetization at said depth of interest z.

5. A method in accordance with claim 1 further characterized by repeating steps (a), (b) and (c) in sequence at a plurality of mapping depths along said well bore so as to map the entire vertical extent of the well bore.

6. A method in accordance with claim 1 in which said magnetometer means is a single magnetometer having an axis of response parallel to said direction S of interest.

7. A method in accordance with claim 1 in which said magnetometer means includes three separate magnetometers having axes of response orthogonal to each other and a composite axis of response parallel to said direction S of interest.

* * * * *